United States Patent [19]

Laurence et al.

[11] Patent Number: 5,306,531

[45] Date of Patent: Apr. 26, 1994

[54] METHOD FOR MANUFACTURE OF PLASMA ION NITRIDED STAINLESS STEEL PLATES

[75] Inventors: Kenneth J. Laurence, West Chester, Ohio; Wolfgang Kieferle, Berg, Fed. Rep. of Germany

[73] Assignee: Formica Technology, Inc., Wilmington, Del.

[21] Appl. No.: 39,654

[22] Filed: Mar. 30, 1993

Related U.S. Application Data

[62] Division of Ser. No. 810,244, Dec. 19, 1991, Pat. No. 5,135,944.

[51] Int. Cl.⁵ .............................................. B05D 3/06
[52] U.S. Cl. ................................. 427/569; 204/192.16; 204/192.3; 204/192.35; 427/255.1; 427/255.4; 427/318; 427/398.1
[58] Field of Search ............... 427/528, 530, 534, 535, 427/579, 248.1, 318, 398.1, 569, 255.1, 255.4; 204/192.16, 192.3, 192.35

[56] References Cited

U.S. PATENT DOCUMENTS

| | | | |
|---|---|---|---|
| 1,995,484 | 3/1935 | Sullivan | 148/31 |
| 3,892,597 | 7/1975 | Lincoln et al. | 148/16.6 |
| 3,928,527 | 12/1975 | Wohnhaas et al. | 264/258 |
| 3,932,085 | 1/1976 | Horbach | 425/186 |
| 4,016,013 | 4/1977 | Bitzer et al. | 148/165 |
| 4,036,482 | 7/1977 | Kieferle | 266/252 |
| 4,236,942 | 12/1980 | Rudd et al. | 148/16.6 |
| 4,264,380 | 4/1981 | Rose et al. | 148/16.6 |
| 4,288,306 | 9/1981 | Kieferle et al. | 204/192 R |
| 4,321,126 | 3/1982 | Kieferle et al. | 204/298 |
| 4,413,302 | 11/1983 | Maixner et al. | 361/212 |
| 4,446,351 | 5/1984 | Kawaguchi et al. | 219/69 W |
| 4,702,779 | 10/1987 | Madsac et al. | 148/16.6 |
| 4,738,730 | 4/1988 | Ferguson | 148/16.5 |
| 4,740,483 | 4/1988 | Tobin | 437/187 |
| 4,756,774 | 7/1988 | Fox | 148/165 |
| 4,764,394 | 8/1988 | Conrad | 427/38 |
| 4,765,847 | 8/1988 | Arai et al. | 148/15.5 |
| 4,776,901 | 10/1988 | Heminghous | 148/16.5 |
| 4,793,871 | 12/1988 | Dawes et al. | 148/16.5 |
| 4,803,127 | 2/1989 | Hakim | 428/457 |
| 4,806,175 | 2/1989 | Wendt | 148/16.5 |
| 4,846,899 | 7/1989 | Wilson | 148/16.6 |
| 4,853,046 | 8/1989 | Verhoff et al. | 148/16.5 |
| 4,857,119 | 8/1989 | Karst et al. | 148/318 |
| 4,871,401 | 10/1989 | Arai | 148/14 |
| 4,872,926 | 10/1989 | Giacobbe | 148/13.1 |
| 4,875,658 | 10/1989 | Asai | 251/129.21 |
| 4,900,371 | 2/1990 | Dexter et al. | 148/203 |
| 4,904,316 | 2/1990 | Dawes et al. | 148/318 |
| 4,913,749 | 4/1990 | Hengerer et al. | 148/165 |
| 4,921,025 | 5/1990 | Tipton et al. | 148/16.5 |

FOREIGN PATENT DOCUMENTS 2656470 6/1978 Fed. Rep. of Germany .
8607568 12/1986 World Int. Prop. O. .

OTHER PUBLICATIONS

*Glow Discharge Nitriding, Heat Treating, Cleaning & Finishing, Metals Handbook* (8th Edition), American Society for Metals (ASM), p. 162, 1964.

*Chemical Abstracts;* vol. 89, No. 24; Dec. 1978; Columbus, Ohio, U.S.; Abstract No. 202274r; Oishi Yoshihiko; "Wear Resistant Material."

(List continued on next page.)

*Primary Examiner*—Bernard Pianalto
*Attorney, Agent, or Firm*—Keck, Mahin & Cate

[57] ABSTRACT

A process and apparatus is disclosed for the fabrication of press plates hardened by the use of plasma ion nitriding techniques to produce wear resistant decorative laminate containing alumina grit while improving associated press plate useful life. The application of this process to press plates having exacting final microfinish requirements is possible due to the determination of interdependancies between parameter settings and expected results. These interdependancies include the work piece geometry, surface and subsurface structure and desired results, process temperatures, pressures, and duration of heat-up time, thermal loading, reflective radiation and heat effects, cooling systems, and gas mixture composition.

2 Claims, 3 Drawing Sheets

OTHER PUBLICATIONS

*VDI-Zeitschrift;* vol. 110, No. 5; Feb. 1968; Dusseldorf, DE; pp. 177-179; Josef Klausler; "Das Ionitrierverfahren und Seine Anwendungsmoglichkeiten."

*Electrowarme International;* vol. 34, No. B6; Dec. 1976; Essen, DE; pp. B298-B305; B. Schweer; "Ionitrieren-anlagen und Anwendungsgebiete."

*Ion Nitriding. Case Hardening of Steel, Metals Handbook* (Desk Edition), American Society for Metals (ASM), pp. 28-26, 1985.

*Thin Solid Films;* vol. 181, No. 10; Dec. 1989; Lausanne, CH; pp. 343-350; S. P. Hannula; "Surface Structure and Properties of Ion-Nitrided Austenic Stainless Steels."

*Metal Plazma Technology,* MPT America Corporation Corporate Brochure, Circa 1990.

*Metal Plasma-Triding-Metal Plasma Technology,* MPT America Corporation brochure, circa 1990.

*Sun Steel's Ionitriding Process Will Improve the Wear Resistance of Your Plastics Molds by 2 to 10 Times,* Sun Steel Treating Inc. brochure, circa 1990.

*Ion Nitriding and Nitrogen Ion Implantation: Process Characteristics and Comparisons,* Arnold H. Deutchman et al., *Industrial Heating,* p. 32, Jan. 1990.

METHOD FOR MANUFACTURE OF PLASMA ION NITRIDED STAINLESS STEEL PLATES

This is a divisional patent application of co-pending U.S. Pat. application Ser. No. 07/810,244 filed on Dec. 19, 1991, U.S.Pat. No. 5,135,944.

BACKGROUND OF THE INVENTION

1. Field of the Invention

The present invention relates to plasma ion nitrided (ionitrided) steel plates for use in pressure applications and, more particularly, to an improved highly durable plasma nitrided stainless steel press plate having a high-quality microfinish and methods for the manufacture of same for use in the production of wear resistant decorative laminate.

2. Description of the Prior Art

The manufacture of decorative laminate has undergone a series of innovations which have lead to greater and greater consumer expectations regarding decorative laminate durability and resistance to mar, scratch, scuff and abrasive wear. Recent efforts to produce such a wear-resistant decorative laminate, especially high pressure decorative laminate, have included the use of extremely hard alumina grit of varying sizes incorporated within the laminate surface. Whereas in the past, formulations for some decorative laminates comprising 6 micron grit as 1 percent by weight in liquid resin and 15 micron grit as 0.5 percent by weight in liquid resin have been utilized, current product trends indicate that formulations having up to 30 micron grit as 9 percent by weight in liquid resin may be necessary to meet consumer laminate wear expectations.

Press plates used to produce decorative laminates are somewhat unique in overall geometry. Manufactured from various grades of steel, particularly stainless steel, the press plate is a flat sheet of rectangular cross section and often has comparatively large longitudinal and transverse dimensions, for example, as large as sixteen and five feet, respectively. The press plates, while thus having large planar surface areas, are only about one eighth of an inch thick.

In a polished condition, the press plates ideally take on the appearance of a mirror-like sheet due to an extremely uniform planar surface, or microfinish, where microscopic discontinuities are minimized. Indeed, in the case of polished press plates, press plate microfinish quality can be determined by viewing reflected images on its surface and scrutinizing the reflected images for optical discrepancies.

Textured press plates, produced by mechanically shot peening or chemically etching their planar surface, or combinations thereof, are usually of much lower gloss than polished plates, such that instrumental gloss measurement rather than visual reflectivity is usually the primary method of characterizing their quality, although certain defects are also evident with visual inspection. Instrumental gloss measurements, in ISO or NEMA gloss units, are typically established by the manufacturer of the laminate based upon consumer expectations. The laminate gloss level in turn is directly related to the gloss of the press plates from which it is produced. The greater the gloss of the plate, the more apparent plate wear becomes.

Also, as a large flat surface used to impart a surface finish to a cellulose supported viscous resin matrix, the press plate must be free from warpage to the maximum extent possible. Warpage generally takes two forms. The first is a regular bow occurring over the entire longitudinal or transverse dimension. At modest levels, this bow is tolerable so long as the press plate assumes a nearly perfect planar orientation under the pressure of the press, which is normally in the range of 1000 to 1600 psi (6.9 to 11.0 N/mm$^2$). The second type of warp manifests itself as localized distortions and buckling, with variations in the relative height of the press plate from a hypothetically perfect planar surface. This second type of warpage is entirely objectionable as it often does not correct itself under the pressure of the press and thus often results in defective laminate appearance and scrapping of the press plate. Both types of warpage, caused by stress relief or uneven heating, often accompanies efforts to harden the press plates by conventional means.

Thus, the level of manufacturing precision required to fabricate and maintain an overall smooth microfinish and warp-free surface, on both sides of the press plate, is critical. For example, press plates are generally used in a sandwich configuration with two composites of laminate resin-impregnated papers placed therebetween, facing opposite directions. Multiple layers of interleaved laminate material and press plates, so-called "packs" or "books", are then loaded into a press for thermal curing and pressure treatment consolidation. If excess warpage of the first type or any warpage-of the second type exists in the press plate, as well as imperfections in the surface microfinish, significantly deleterious effects on the finished decorative laminate appearance will be apparent.

However, the use of alumina grit to improve the wear-resistance of decorative laminate, even in the lower grit sizes and concentrations used in the past, destroys the surface microfinish of the conventional steel press plates heretofore employed to fabricate decorative laminates.

The physical interaction of the formulation grit and the surface of the press plate causes microscratching and resulting lower gloss, haziness, "soft glow" high spot texture wear and at times metal rub-off. Further, as the surface microfinish of the press plates imparts its overall surface finish to the final laminate product, for example, to form a high gloss or textured surface finish in the decorative laminate, any marring of the surface microfinish of the press plates renders the press plates unusable and often requires the damaged press plates to be refurbished at considerable expense or ultimately scrapped.

Attempts to use press plates of greater surface hardness fail to yield a technically and economically viable solution. Conventional polished stainless steel press plates suffer unacceptably severe microscratching after just one press run with any size alumina grit-. Textured stainless steel press plates are also easily microscratched by alumina grit. Although not as visually apparent, as with highly polished plates because of their much lower initial gloss level and inherent texture structure, the resultant gradual deterioration in gloss and texture erosion, particularly with use of larger grit sizes and concentrations, necessitates frequent refinishing.

If these stainless steel plates are hardened by conventional heat treating methods, the plates become too brittle, stress fractures can occur, and warpage becomes a significant problem. Chrome plated steel press plates also suffer from severe microscratching after relatively few pressings. Chrome plating and post-baked electroless nickel deposition on stainless steel plates have been used, yet do not satisfactory resolve the problems of grit-related microscratching and plate wear. Further, buffing and polishing operations used for polished plates or shot-blasting refinishing operations used for textured plates tend to remove the thin plated layer unevenly, causing considerable cost to re-plate the surface. The trend toward greater concentrations of even greater sized grit formulations only exacerbates these problems.

Heretofore, ferrous based alloys have been surface hardened by various treatments involving the deposition and diffusion of additional elements and compounds into the base material, notably nitrogen and carbon. However, the wide variety of industrially practiced methods used to case harden stainless steel parts are suspectable to size restrictions and high processing temperatures, often requiring subsequent oil or water quenching, which can result in unacceptable surf ace finishes and part warpage. Thus, these alternatives are impractical for treating large, relatively thin press plates.

The present invention unexpectedly has found that a concept known as plasma ion nitriding overcomes deficiencies inherent in known press plate hardening means and for the first time enables the manufacture of press plates for use in the production of wear resistant laminates containing concentrations of large alumina grit. Many applications of plasma ion nitriding techniques have been applied to significantly smaller articles or larger articles with relatively small surface to volume ratios where the final microfinish has not been a critical cosmetic aspect of the article, such as via the MPT GmbH Plasma-Triding ® process with an automated control and arc discharge suppression system, which regulates the plasma input energy for better control of the quality of work treatment. None of these applications suggested that plasma ion nitriding would be a solution to the problems solved by the present invention.

Plasma ion nitriding is based on plasma discharge physics and operates by exposing a negatively charged metal work piece surface to positively charged nitrogen ions. Under vacuum in a sealed vessel, an electrical potential is applied to the system, wherein the vessel becomes the positively charged anode (electron receptor) and the work piece forms the negatively charged cathode (cation receptor). High voltage energy is used to strip electrons from nitrogen bearing gas molecules introduced into the vessel, forming a plasma, where the nitrogen ions are accelerated toward the work piece. The impact of the nitrogen ions on the surface of the work piece generates heat energy from the conversion of kinetic energy to potential energy. As the nitrogen ions impact the work piece surface, iron atoms predominantly are sputtered off at the point of impact to combine with other nitrogen ions forming iron nitride ions above the work piece surface in the glow discharge "seam". These iron nitride ions then impact and deposit on the heated work piece surface and diffuse into the subsurface molecular boundaries, creating an exposed surface layer and a distinct subsurface structure offering many of the desired characteristics for press plates as noted above, such as high hardness without brittleness, an unmarred surface finish, and a determined case depth.

OBJECTS OF THE INVENTION

Accordingly, it is an object of this invention to provide a hardened flat work piece, such as a press plate, for the economical production of wear resistant decorative laminates.

It is a principle object of this invention to provide a plasma ion nitrided press plate which provides significantly greater wear life in the production of decorative laminates.

It is a further object of this invention to provide a press plate for the economical production of wear resistant decorative laminates having a high-quality microfinish of greatly extended press plate life.

It is also an object of this invention to provide a press plate free of objectionable warpage for the economical production of wear resistant decorative laminates.

It is another object of this invention to provide a method for producing a plasma ion nitrided press plate offering significantly greater wear life in the production of decorative laminates.

It is yet another object of this invention to provide the processing parameters for producing a plasma ion nitrided press plate for the economical production of wear resistant decorative laminates.

It is a still further object of this invention to provide a method for using a press plate hardened by plasma ion nitriding processes for the economical production of wear resistant decorative laminates.

Other objects, advantages, and features of the present invention will be in part apparent and in part explained by reference to the following detailed description and appended claims, and upon reference to the accompanying drawings.

SUMMARY OF THE INVENTION

In accordance with this invention, a process and apparatus were developed to harden press plates by the use of plasma ion nitriding techniques, wherein to the applicants' knowledge such large work piece plasma ion nitriding has never before been attempted or successfully achieved.

The application of the plasma ion nitriding process to large work pieces having very exacting final microfinish requirements, as disclosed by the present invention, is an advance due to the complicated relationships between parameter settings and expected results. These relationships include the work piece geometry, material surface and subsurface structure and desired results, process temperatures, pressures, and duration of heat-up time, thermal loading, radiant and convective heat energy effects, cooling system requirements, and gas mixture composition.

Accordingly, testing and analysis was coordinated to determine the proper functional parameters, the interrelationship of functional parameters, and the allowable variance within each functional parameter or group of functional parameters to produce the desirable product specifications. To this end, a general geometry formula was identified which describes the press plate surface area to thickness ratios for which the required parameters will apply.

BRIEF DESCRIPTION OF THE DRAWINGS

For a more complete understanding of this invention, one should refer to the embodiment illustrated in greater detail in the accompanying drawings and described below by way of examples of the invention.

In the drawings.

DETAILED DESCRIPTION OF THE PREFERRED-EMBODIMENTS

Figure 1:
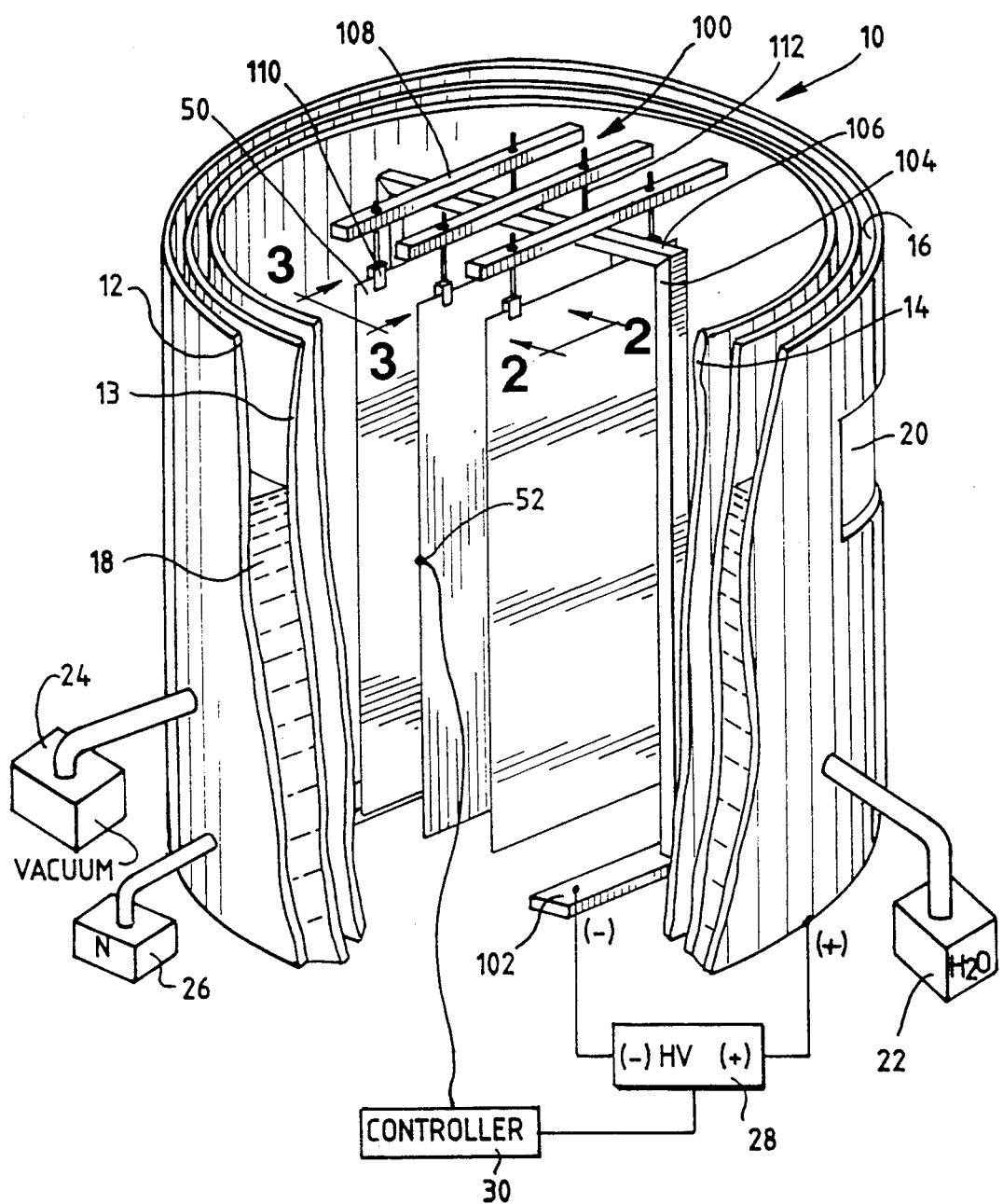
FIG. 1 is a simplified perspective view of the nitriding vessel related to the invention, with the press plate fixture installed.

Referring to the FIGURES, wherein like reference characters designate like or corresponding parts throughout the views, FIG. 1 illustrates the overall configuration of the reaction vessel 10 and the stainless steel press plate fixture 100 as installed. The reaction vessel 10 related to the present invention is that used by the MPT GmbH PLASMA-TRIDING ® process employing THERMION ® processing and control equipment.

For purposes of simplified presentation, however, the vessel 10 includes a cylindrical outer wall 12, a cylindrical inner wall 13, and a cylindrical heat deflection shield 14, all located concentrically within the outer wall 12. It should be understood that other vessel geometries (i.e., a horizontal rectangular chamber), and control system configurations are also capable of producing the desired results, and that vessel size is important only to the extent of the restriction it places on the press plate dimensions that can be processed. The outer wall 12, the inner wall 13, and the heat deflection shield 14, as will be discussed below, act as the anode during the nitriding process. Between the outer wall 12 and the inner wall 13 is an annular cooling water chamber 16, wherein cooling water 18 is passed through to assist in maintaining the critical processing temperatures, as will be discussed below. The outer wall 12, the inner wall 13, and the heat deflection shield 14 share a viewing port 20 to allow for visual "glow checks" of the press plate during the nitriding process. The inner wall 13 and the heat deflection shield 14 are preferably formed from stainless steel or an alloy to prevent extraneous metals from becoming disassociated and contaminating the gaseous mixture treating the press plate.

The vessel 10 is further provided with a water supply 22 to provide the annular cooling water chamber 16 with a continuous regular source of cooling water to avoid excessive temperatures in the vessel 10, which if unchecked can contribute to excessive press plate temperatures and subsequent objectionable press plate warpage. The vessel 10 is further provided with a vacuum pump 24, a gas supply containing nitrogen 26, a high voltage source 28, and a controller unit 30. The high voltage source 28 provides a positive charged DC supply to the vessel 10 structure and a negative charged DC supply to the hanging fixture-press plate assembly 100 contained within. The controller unit 30 corresponds to the THERMION ® control equipment used in the MPT GmbH PLASMA-TRIDING ® process.

Figure 3:
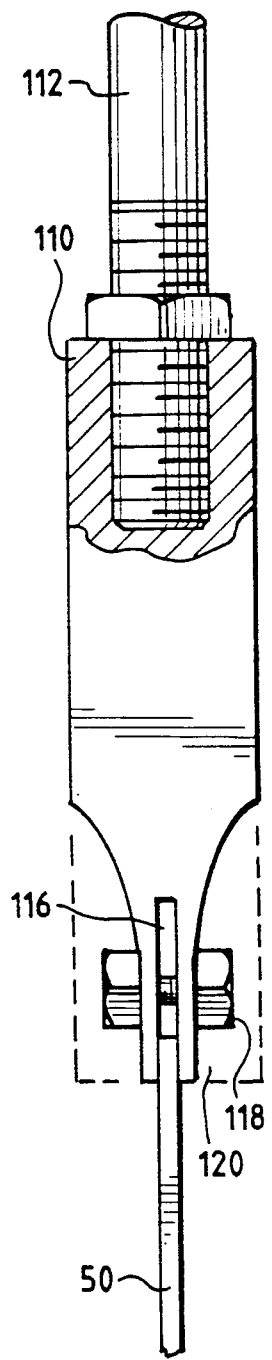
FIG. 3 is a side elevation view of the clamp of the press plate fixture along the view 3—3 shown in FIG. 1.
Figure 2:
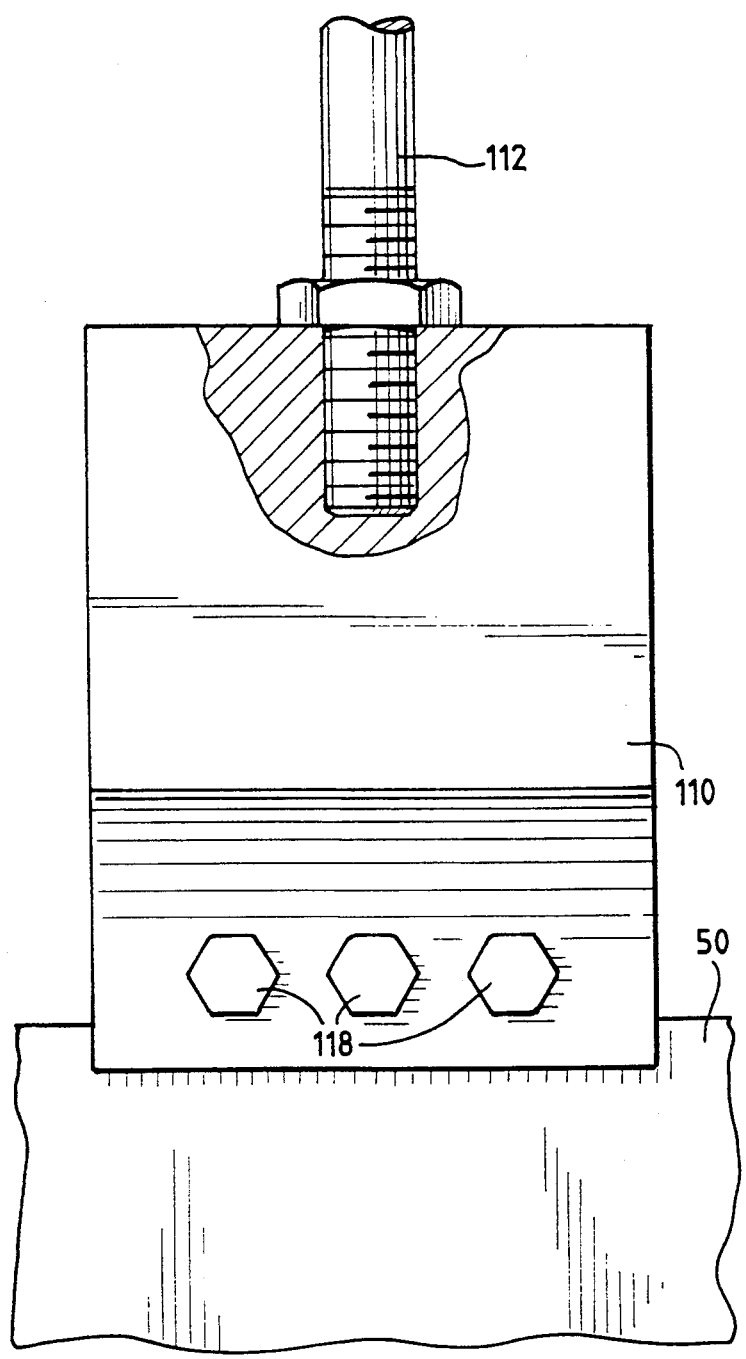
FIG. 2 is a front elevation view of the clamp of the press plate fixture along the view 2—2 shown in FIG. 1.

The fixture 100 as shown in FIG. 1 is comprised of base members 102, support rods 104, cross member 106, and support arms 108. As seen in FIGS. 1, 2, and 3, the press plate 50 is suspended from the support arms 108 with clamps 110 and hanging rods 112. The press plates 50 must be separated by a distance sufficient to avoid interaction of the glow discharge plasma boundary of one press plate with that of the adjacent press plates. Further, this distance must minimize heat transfer from one press plate to the adjacent press plate to thereby avoid thermally induced distortions. Initial testing indicates that this distance is preferably about 8 inches (20.3 centimeters) or more, although other press plate dimensions may require different spacing criteria.

As better viewed in FIGS. 2 and 3, the clamps 110 are simple clevis devices supported by hanging rods 112. At the opposite end, a notch 116 is sized to slidingly accept the thickness of the press plate 50, which is usually about one eighth of an inch. Once the press plate 50 is inserted into notch 116, the clamp 110 is affixed to the press plate 50 by tightening fasteners 118. The clamp 110 is then attached to the support arms 108 through the hanging rods 112. To reduce the amount of thermally absorbent material about the edge of the press plate 50, the clamp 110 is tapered inwardly toward the notch 116 by cutting or milling the projecting corners 120 away (shown in phantom). Accordingly, the amount of mass which can absorb heat from the press plate 50 is minimized, which has been found to be a critical aspect of the present invention. It is very important that the press plate 50 be exposed to as little temperature gradations as possible to avoid warping. Thus, by clamping each of the press plates 50 to the clamps 110, attached to the support arms 108 coupled to the cross-member 106, the press plate 50 can be suspended in the vessel without substantial thermal interaction with the fixture 100.

The preferred method of nitriding is according to the MPT GmbH PLASMA-TRIDING ® process using THERMION ® processing and control equipment. This process utilizes electronic control equipment with arc discharge suppression control to minimize plate defects. Special processing conditions must be used, for the press plates according to the present invention and are addressed below. The energy of the impact of the nitrogen ions, if uncontrolled, often generates heat energy and work piece temperatures capable of destroying the utility of large work pieces, such as press plates. This damage is evidenced by the deleterious effects of objectionable warping, buckling, and blemishes to the microfinish including imperfections such as arc trails ("spider marks" and "Pimples"), localized meltdown ("comet tails"), clamp mark "halos", and other damage to the work piece. Accordingly, the commercial use of plasma nitriding for the hardening of large work pieces with exceptionally high surface to volume ratios, such as press plates, has heretofore not been considered viable.

The processing of the press plates to be treated in accordance with this invention begins with a prenitriding two-step cleaning procedure to remove water soluble, oil soluble, and insoluble residues from the work piece. These can often be attributed to the cause of "arc trails". The failure to remove any such residue can result in especially intense arc discharges during the initial nitriding process, which can damage the microfinish of the press plate 50.

The residues on the surface of a press plate typically are present in minute quantities resulting from earlier processing of the plate 50. Freshly refinished polished plates, although appearing visually clean, will still have residual polishing or buffing compounds (commonly called rouges) deposited on their surface. Rouges typically are composed of a very fine abrasive material such as alumina combined with a waxy material (solid at room temperature which melts when applied to a warm plate during processing) or the abrasive material is combined with fatty acid "greases" in a water based emulsion (liquid at room temperature). Freshly refinished textured plates, using shot-blasting techniques, usually have remnants of very fine dust, resulting from some breakage of the shot used in the blasting process, adhering to the plates' surface because of static charges. Oily fingerprints, and other extraneous oil and grease spots on either type of plate, but particularly the textured plates, are common types of contamination as well. Additionally, press plates, particularly those not freshly refinished, will usually have deposited on their surface trace amounts of a mold release agent which can be applied directly to the plate (external release agent), but is most often incorporated into the liquid surface resin itself (internal release agent). These release agents promote easy separation of the plates from the laminates after curing in the pressing operation. The most widely used release agents are fatty acid based, including common tallow acid soap (stearate/palmitate mixtures), zinc stearate powder (applied directly to the plate) and a variety of commercially available products well known to those versed in the art.

The two-step cleaning procedure involves first thoroughly cleaning a plate with deionized water. After allow it to dry, the plate is then thoroughly washed with a chlorinated hydrocarbon solvent, of which 1,1,1-trichloroethane is the preferred solvent. In this manner, both water soluble and oil soluble materials are dissolved and removed from the plate, as are remaining insoluble particles by means of the physical washing action.

The press plate 50 is then mounted in the fixture 100, as described above. As an important aspect of this invention, the loading and fixturing of the press plates has a direct impact on the selection of process parameters. The thermal loading of the press plates generates radiant and convective heat energy, which in turn necessitates the proper modulation of the press plate temperature. The dissipation of this heat energy generated is controlled through the modulation of the input voltage, the flow rate of the cooling water chamber 16, and the spacing of the press plates 50 within the vessel 10.

A temperature sensing means, preferably a thermocouple 52 as shown in FIG. 1, located within the loaded vessel 10 is a primary factor in modulating the heat energy generated within the vessel 10. The thermocouple 52 placement at the edge of a centrally located press plate mounted to the fixture 100 has been found to be an ideal location for this geometry. Because of plasma physics and because of the ion bombardment on all surfaces of an "edge" or a "corner", this edge or corner will have the tendency to heat-up faster than the center of the plate 50. Therefore, the temperature of the outside surface of the press plate 50 will increase somewhat more quickly than the center of the plate. The thermocouple 52 at the edge thus offers better control over the heat-up rate and a more consistent temperature profile through the cross section of the plate 50. Other locations for the thermocouple were found to lead to erroneous temperature data, which tends to confound controller 30 input and can lead to distortion and an uneven case hardness.

The vessel 10, after loading, is then sealed and air is evacuated by vacuum pump 24 to form a vacuum therein. The vessel 10 is then filled with a nitrogen-containing gas, such as gaseous ammonia, at a pressure of 0.04 to 0.12 psi (3 to 8 millibar) through nitrogen gas supply 26. Other gaseous mixtures containing nitrogen atoms may also be advantageously employed. For example, in the case of press plates having high chromium content, a nitrogen and hydrogen mixture would be recommended, as the hydrogen promotes the formation of chromium nitride. Furthermore, this gaseous mixture can be more easily controlled for purity and dryness. However, excessive concentrations of hydrogen in the presence of a base material having low or no chromium content can contribute to hydrogen embrittlement. The use of carbon-bearing gases, such as methane, in the gas mixture is not recommended due to the deleterious effects of carburization.

A voltage is then applied to the system through the high voltage source 28 and a glow discharge forms about the press plate as the process enters the sputtering phase. Arc discharges generated within the glow discharge are directed toward any remaining residue and deposits on the work piece and serves as a final cleaning process. Any such residue or deposits are thus vaporized and removed from the work piece. In this phase, the work piece itself has only increased moderately in temperature to about 200° F. This phase, corresponding to Region I of FIG. 4, continues until all deposits are removed and the arc discharges diminish.

Figure 4:
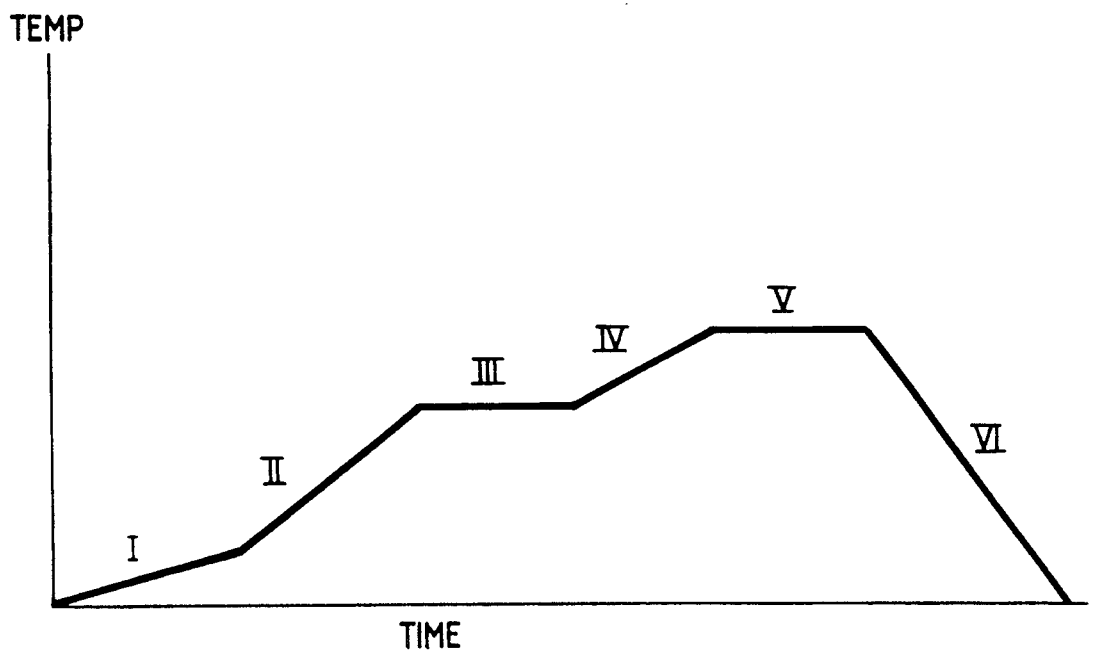
FIG. 4 is a chart depicting the temperature profile over time of the process according to the invention.

The voltage is then steadily increased, as shown in Region HI of FIG. 4, to accelerate the ion bombardment and begin the temperature rise to temperatures optimum for the nitriding phase. During this phase, the human eye is used to conduct a "glow check" operation. As the operation requires the regulation of the rate of increased power input, a "glow check" through the port 20 of the vessel 10 to observe the uniformity and color of the glow discharge is made. As the press plate 50 begins to glow about its outside surface, it is important to allow the center of the press plate 50 to reach the same temperature without a large and potentially damaging temperature disparity between the edge and center press plate 50 portions. Thus, when the outer edges of the press plate 50 glow to reveal the appropriate temperature as evidenced by the proper glow color, the voltage intensity is maintained for about one hour, as depicted by Region III of FIG. 4, allowing the remaining portions of the press plate to reach an even temperature distribution. It has been determined that this glow temperature should be maintained at about 70 to 80 percent of the maximum nitriding temperature.

Also, the press plate 50 should be inspected for "hot spots" during this period. As the glow color is directly proportional to the surface temperature of the press plate, any variations in color would indicate a variation in temperature, which should be avoided. As noted above, the temperature can be controlled via voltage input and the water flow rate through the water chamber 16.

Once the work piece temperature is stabilized, the voltage is increased, as-shown in Region IV of FIG. 4, to 100 percent of that required to obtain the maximum desired temperature, and the automatic processing system is allowed to control the remaining processing, depicted as Region V of FIG. 4. During the cool-down phase, shown as Region VI of FIG. 4, the controller 30 is also used, while the vessel 10 is kept under vacuum to avoid oxidation on the press plate 50. The water flow in the cooling chamber 16 should also be maintained.

During the processing phase of Regions I, II, III, IV, and V, additional nitrogen-containing gas must be added to the vessel 10 to replenish that which is ionized and deposited on the work piece or lost to the vacuum system. Thus, additional gas is constantly introduced at very slow flow rates to maintain the vessel partial pressure. This flow rate has been determined to be dependant on the cycle time and modified as necessary.

Based on empirical test results, the processing parameters found most favorable for the geometry of press plates are provided in Table A.

TABLE A

| Parameter | Set | Region of FIG. 4 |
|---|---|---|
| Maximum temperature: | 750–850° F. (400–450° C.) | |
| Pressure: | 0.04–0.12 psi (3.0–8.0 mb) | |
| Heat-up time: | 12–20 hours | Regions I & II |
| Processing time: | 20–48 hours | Regions III, IV & V |
| Cooling time: | 2–8 hours | Region VI |

The selection of a parameter "set" depends on the desired hardness and case depth of the work piece. This hardness is manifest in two portions of the work piece; the compound layer and the diffusion zone. The compound layer is formed on the exposed surface and is comprised essentially of ferrous nitride compounds and, in the case of stainless steel, a percentage of chromium nitride compounds. The diffusion zone, found beneath the compound layer, is hardened to a slightly lesser degree due to the propagation of nitrogen ions and ferrous nitride ions into the grain boundaries to form a decreasing concentration of nitride compounds. Thus, the compound layer and diffusion zone to be hardened, defining the hardened case depth, is related to the material and the geometry of the press plate 50. Note that the voltage potential (and corresponding temperature) and processing time are inversely related; if the processing time of Region V is extended, the overall maximum temperature can be reduced.

The geometry formula developed in conjunction with the present invention examines the surface area to thickness ratio. The relationship of surface area in square feet to plate thickness in inches should be 150 square feet/inch to 2800 square feet/inch (5.5 square meters/centimeter to 102.5 square meters/centimeter). These values correspond to press plates having nominal dimensions of 3 feet by 7 feet (0.9 meter by 2.1 meters) having a thickness of one quarter inch (0.64 centimeter) and press plates having nominal dimensions of 5 feet by 16 feet (1.5 meters by 4.9 meters) having a thickness of one sixteenth inch (0.16 centimeter), respectively. Combinations of length, width, and thickness within these numeric ratios should be within the indicated parameters of the instant invention.

It has been determined that the preferred compound layer depth is between 0.0001 and 0.0004 inch (0.0025 and 0.0102 millimeter). The overall preferred case depth, including the compound layer and diffusion zone, is between 0.001 and 0.004 inch (0.025 and 0.102 millimeter). However, other compound layer and diffusion zone thicknesses can be obtained depending on the specific requirements of the end product.

Preferably, the vessel 10 is vented and the press plate 50 is removed from the unsealed vessel 10 only after it reaches room temperature. However, the press plate 50 can be removed when its temperature cools to about 200° F. (100° C.). Although removing the press plate 50 prior to its reaching room temperature reduces the processing time by six hours for productivity purposes, it also creates some oxidation on the plate surface caused by room temperature air coming into contact with the warm press plate 50 when the vessel 10 is opened. This layer can be rubbed off as necessary. If the work piece is allowed to reach room temperature, ie., a significantly extended cool-down period opposed to the shorter 2 to 8 hour period noted above, it has been found that a shinier finish with less oxidation may be obtained. The oxidation caused by the room temperature air entering the vessel 10 while the press plate 50 is above room temperature may be avoided by the introduction of nitrogen or an inert gas into the vessel without voltage input to accelerate the final phase of the cooling process.

However, it must be emphasized that accelerating the cool-down rate with the plate still at an elevated temperature (between the processing temperature and above about 200° F. (100° C.)) can result in stress relief of the plate accompanied by its deformation. The cooler air entering the vessel 10 does not contact the press plate 50 uniformly contributing to sharp thermal gradients and accompanying stress relief. Decreasing the cooling chamber 16 temperature, increasing the cooling chamber 16 flow rate, venting the vessel 10 to atmosphere (which will also cause severe oxidation of the plate surface), or introducing an inert "cooling gas" are all mechanisms that at elevated temperatures can promote such stress relief and deformation. The higher the temperature at which such accelerated cooling is attempted, the more serious the plate-deformation and possibly oxidation will be.

To appreciate the advantages of the present invention, "conventional" non-hardened polished press plates used to produce grit-free decorative laminates must be refinished on average about every 200 cycles due to normal handling damage. Plates used to press more critical colors, such as dark or black solid color laminates, may be refinished or down-graded after as few as 30 to 50 cycles because of handling damage so as to maintain acceptable laminate finish quality.

In addition to the optical distortion evaluations used to determine the quality of the press plate surface finish, the surface finish of the laminate manufactured by the press plate can also be used to determine the press plate surface finish quality. NEMA 60 degree gloss measurements are commonly used to characterize laminate finishes. As the marketplace has become much more critical in recent years, haze-free high gloss surfaces are now demanded. As such, the scale shown in Table B is generally accepted in the industry.

TABLE B

| Laminate Gloss | Finish Quality |
|---|---|
| ≧100 | excellent |
| 95–99 | good–very good |
| 90–94 | marginal |
| <90 | unacceptable |

TABLE B
Laminate Gloss Finish Quality
>100 excellent
95-99 good-very good
90-94 marginal
<90 unacceptable To measure the improvement in performance with nitrided press plates, trial runs on black glossy finish "Proof" laminates, the severest test of plate finish quality, were compiled using full scale 4 feet by 10 feet (1.22 by 3.05 meters) polished press plates as shown in Table C. The grit used was aluminum oxide incorporated within a liquid melamine surface resin.

TABLE C

Number of Press Runs to Produce Commercially Unacceptable Microscratching

| Surface Grit Size/Loading | Standard 410 SS | Hard Chrome Plated 410 SS | Plasma ion Nitrided 410 SS |
|---|---|---|---|
| 5% 3 u | 1 | >81* | NA |
| 1% 6 u | 1 | 8 | 234 |
| 1% 6 u and 0.5% 15 u | 1 | NA | >100** |
| 0.8% 6 u and 1.6% 25 u | 1 | 1 | NA |
| 9% 30 u | 1 | NA | >15 and <33 |

*NEMA 60 degrees gloss 99.1 at 8 pressings
NEMA 60 degrees gloss 95.8 at 63 pressings
**NEMA 60 degree gloss 98.5 at 1 pressing with Dorigon gloss 43.5 and Haze Index 1.20
NEMA 60 degree gloss 97.1 at 100 pressings with Dorigon gloss 60.7 and Haze Index 0.93

For example, the laminate produced from the 3u grit as 5 percent by weight of liquid resin in trial runs using a chromed polished plate suggests that deterioration in the plate and laminate microfinish occurred from microscratching. Note that the NEMA gloss value for this trial fell from a very good, nearly excellent level of 99.1 to only a marginally acceptable level of 95.8, suggesting significant plate wear occurred over a period of 55 pressings. Additional pressings, at least up to 81 pressings, continued this trend toward decreasing acceptability.

Conversely, after 100 pressings with the nitrided polished press plate using much more aggressive 6u and 15u grit formulations, the gloss remained constant in the good to very good category. As Dorigon gloss is a very good indication of a glossy laminate's finish quality, it is therefore a key index of the quality of the polished plate from which the laminate was produced. Experience indicates that Dorigon gloss values of 40 or greater, and haze indices of less than 1.5 are indicative of an excellent quality, highly reflective laminate and plate microfinish. Note that even with this relatively aggressive grit formulation, the laminate produced after 100 pressings exhibited no deterioration in Dorigon gloss. surprisingly, there appeared to be very significant improvement in reflectivity to a level seldom achieved with any polished plate. It should be noted that the nitrided press plate exposed to 1 percent by weight of liquid resin 6 micron grit was rebuffed after 234 cycles and shown to produce acceptable laminate quality for at least another 103 cycles. Also, although the 9 percent by weight of liquid resin 30 micron grit offers only limited press plate durability compared to smaller grit concentrations and sizes, it nevertheless indicates that the use of such aggressive grit formulations is possible if relatively frequent plate refinishing is acceptable (about the same frequency as a "dark" quality conventional polished plate).

Figure 5:
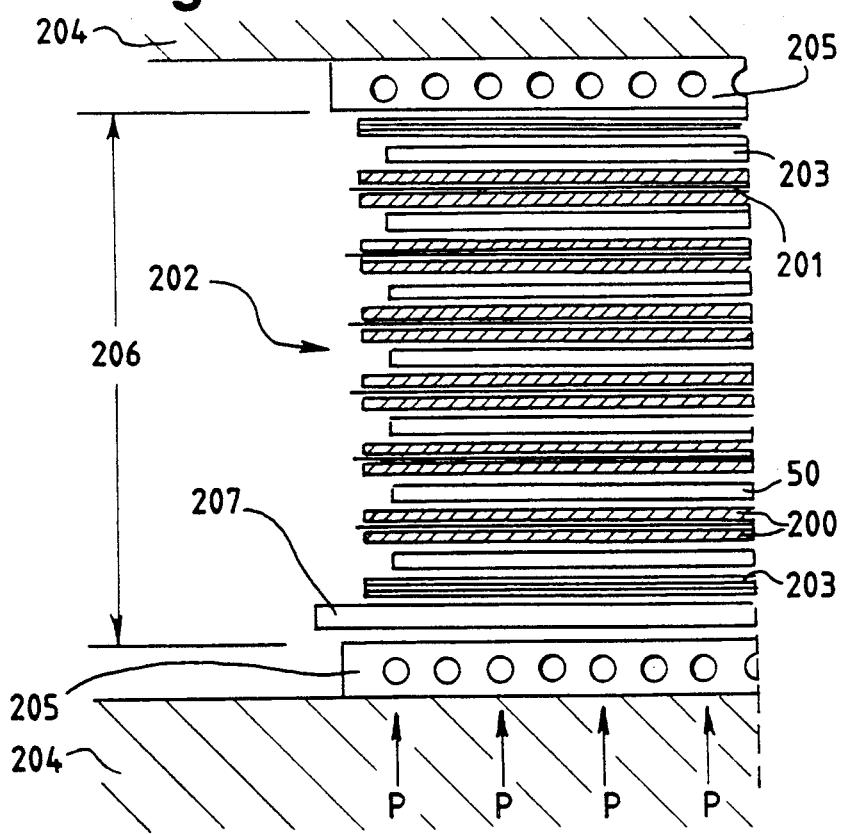
FIG. 5 is a elevation side view of a representational press and pack, utilizing the press plates according to the present invention.

It was also observed during these trials that the nitrided plates were easier to release from the laminate after the curing and pressure process than conventional polished press plates. As noted above, press plates are used with composites of laminate resin impregnated treated papers placed therebetween, facing opposite directions, as shown in FIG. 5. Multiple layers of press plates 50, laminate material 200, separator sheets 201, and cushions 203 placed on carrier trays or "pans" 207 to form "packs" 202, which are then loaded into a press 204 between heating/cooling platens 205 for temperature and pressure treatment consolidation and curing. Note that as the clearance for material movement into the press 204 between the heating/cooling platens 205 is limited by the press opening or "daylight" 206, i.e., the space between two platens when the press 204 is fully open, it is apparent from FIG. 5 that excess plate warpage of the first type can interfere with the ability to move the pack 202 into the press 204.

After the cure period of about 45 to 90 minutes typically at temperatures of 260° to 300° F. (125° to 150° C.) and subsequent cooling, varying levels of physical effort by the press operators are necessary to disassemble the packs 202 into its press plate and finished laminate constituent parts. For example, the releasability of textured plates has been found to be generally less than that of polished plates. Further, "picking", or small deposits of resin and fibrous material remaining on the press plate 50 can occur, with transfer to and contamination of the surface of subsequently pressed laminate from the same press plate 50. In the worst case, the entire laminate sheet can become physically bonded to the press plate 50, causing serious refinishing problems.

These problems are often reduced by the use of release agents on the plate surface, most often incorporated into the resin, or by the use of chrome plated plates. During the aforementioned press plate trials, it was surprisingly found that the nitrided hardened press plates released considerably easier than conventional polished steel plates. It is theorized that the deposition of the compound layer fills in (and seals) the surface microtexture, creating an even smoother microfinish then otherwise possible, reducing its tendency to adhere to the laminate surface in contact with it. Thus, in the event that the desired quantity of release agent is inadvertently omitted or the difficulties of chrome-plating noted above are to be avoided, the use of plasma ion nitrided press plates is expected to offer greater releasability.

Moreover, the invention herein disclosed is not limited to high pressure decorative laminate, but can also be beneficially applied to low pressure decorative laminates, such as those containing a particleboard or medium density fiberboard substrate rather than a plurality of phenolic resin impregnated cellulosic core sheets of the high pressure decorative larainate (surfaced with a print or solid color sheet and optionally, an overlay sheet). In contrast to the cure period of about 45 to 90 minutes at pressures ranging from 1000 to 1600 psi (6.9 to 11.0 N/mm$^2$) for pressing high pressure laminate, low pressure laminates have cycle times of about 1 minute at pressures of 200 to 300 psi (1.4 to 2.1 N/mm$^2$). The use of aggressive grit formulations or other hard materials in the laminate at the rapid cycle rates used to produce low pressure laminates will quickly deteriorate the press plates of such applications. Therefore, the utility of the present invention should be applicable to a wide range of decorative laminate products.

Although these press trials of Table C were limited to nitrided polished plates of 410 stainless steel, where the resulting plate hardness was found to increase from 38–45 HRc to 60–70+ HRc. although hardnesses of over 65 HRc are preferred. potential application for nitride hardened press plates is much broader, as are the grades of stainless steel that can be so treated. The use of plasma ion nitrided textured press plates is expected to display even greater durability in terms of grit related microscratching, wear, and gloss deterioration in comparison to conventional textured steel plates.

Further, while 410 stainless steel has historically been the material of choice, plasma ion nitriding of 630 and 304 alloy stainless steel press plates also offers benefits.

630 stainless steel is similar to 410 stainless steel, but has about half the carbon content (0.05-0.084 versus 0.15%) while maintaining equivalent hardness (42-45 HRc) by means of a special precipitation hardening process. The lower carbon content is preferred for chemical etching of textured plates. A trial with a full size (4 feet by 10 feet (1.22 by 3.05 meters)) textured plate according to the present invention increased the case hardness to 67-70 HRc from 42-45 HRc.

A limited 304 stainless steel trial was also conducted according to the present invention. 304 stainless steel is an annealed "bulk unhardenable" austenitic stainless steel with high chromium content (18.0-20.0 versus 11.5-13.5) and nickel content (8.0-10.5 versus 0.75) compared to 410 stainless steel. Although 304 stainless steel press plates, including high gloss mirror finish plates, are sold commercially and used as press plates due to their lower cost, they are also very susceptible to scratching and other plate handling damage due to their softness. 304 stainless steel is so soft that it bearly registers on the Rockwell C hardness scale (comparative hardness on the "softer" Brinell scale are 140 for the 304 alloy and 390 for the 410 alloy). The case hardness obtained after employing the present invention was 73 HRc, compared to an initial hardness of only 29 HRc. Plasma ion nitriding of 304 stainless steel is thus expected to largely resolve the former problems of 304 stainless steel. Other alternative applications may also exist, i.e., nitrided chrome plated plates, to further increase hardness.

It will be understood that the details, materials and arrangements of parts of specific embodiments have been described and illustrated to explain the nature of the invention. Changes may be made by those skilled in the art without departing from the invention as expressed in the appended claims.

What is claimed is:

1. A method for producing a ferrous press plate for manufacturing decorative laminate, the press plate comprising a planar surface substantially defining the surface finish of the decorative laminate, the method including the steps of:

providing a ferrous based press plate;

cleaning the press plate to remove residue therefrom;

suspending the press plate within a vessel capable of nitriding ferrous materials, and introducing a nitrogen or nitrogen as mixture into the vessel;

applying an electrical potential between the press plate and the vessel, attracting thereby nitrogen ions present in the gas or gas mixture onto the press plate and diffusing the nitrogen ions present in the gas or gas mixture into the surface of the press plate, creating thereby a glow discharge plasma about the press plate and sputtering off of ferrous metal ions from the surface of the press plate for subsequent combination with the nitrogen ions to form nitrogen ferrous metal alloy ions;

adjusting the electrical potential between the press plate and the vessel such that the temperature of the press plate remains substantially below 1000° F;

further maintaining the flow discharge plasma about the press plate, now containing the nitrogen and nitrogen ferrous metal alloy ions for an extended period of at least 20 hours to produce a hardened case by exposure to nitrogen ion and the nitrogen ferrous metal alloy ion bombardment generated by the glow discharge to create the hardened case of a hardness of at least 55 Hc, the case having a total case depth of at least 0.0001 inch;

cooling the press plate; and removing the press plate from the vessel.

2. The invention of claim 1, further including the step of:

interrupting the adjusting of the electrical potential step at a range of 70 to 80 percent of the maximum temperature to allow a substantially uniform glow discharge plasma about and temperature distribution within the press plate.

* * * * *

UNITED STATES PATENT AND TRADEMARK OFFICE
CERTIFICATE OF CORRECTION

PATENT NO. : 5,306,531
DATED : April 26, 1994
INVENTOR(S) : Kenneth J. Laurence et al.

It is certified that error appears in the above-indentified patent and that said Letters Patent is hereby corrected as shown below:

In the Detailed Description of the Preferred-Embodiments, column 7, line 29 of the Patent, change "allow" to --allowing--.

In the Detailed Description of the Preferred-Embodiments, column 8, line 30 of the Patent, delete "HI" before "of FIG. 4" and substitute --II-- therefor.

In the Detailed Description of the Preferred-Embodiments, column 10, lines 61-66 of the Patent, delete "TABLE B, Laminate Gloss Finish Quality, > 100 excellent, 95-99 good-very good, 90-94 marginal, < 90 unacceptable."

In the Detailed Description of the Preferred-Embodiments, column 13, line 8 of the Patent, change "0.05-0.084" to --0.05-0.08%--.

In Claim 1, column 14, line 11 of the Patent, change "as" to --gas--.

In Claim 1, column 14, line 25 of the Patent, change "flow" to --glow--.

Signed and Sealed this

First Day of November, 1994

Attest:

BRUCE LEHMAN

*Attesting Officer*   *Commissioner of Patents and Trademarks*